United States Patent [19]

Pakusch et al.

[11] Patent Number: 5,874,524
[45] Date of Patent: Feb. 23, 1999

[54] PREPARATION OF POLYMER POWDERS WHICH ARE REDISPERSIBLE IN AN AQUEOUS MEDIUM

[75] Inventors: Joachim Pakusch, Ludwigshafen; Reinhold Dieing, Bad Dürkheim; Jürgen Tropsch, Römerberg, all of Germany

[73] Assignee: BASF Aktiengesellschaft, Ludwigshafen, Germany

[21] Appl. No.: 731,989

[22] Filed: Oct. 23, 1996

[30] Foreign Application Priority Data

Oct. 28, 1995 [DE] Germany ............... 195 40 305.3

[51] Int. Cl.[6] .................. C08F 6/22; C08F 6/14; C08J 3/16

[52] U.S. Cl. .............. 528/482; 528/487; 528/501; 523/342; 524/236; 524/814; 524/815; 524/817; 524/904; 525/934

[58] Field of Search .................. 528/501, 487, 528/482; 523/220, 221, 332, 342; 524/236, 555, 904, 814, 815, 817; 525/934

[56] References Cited

U.S. PATENT DOCUMENTS

| | | | |
|---|---|---|---|
| 2,832,747 | 4/1958 | Jackson | 525/108 |
| 3,205,187 | 9/1965 | Vanderhoff et al. | 524/526 |
| 3,784,648 | 1/1974 | Bergmeister et al. | 523/332 |
| 4,038,233 | 7/1977 | Shultz | 524/521 |
| 4,319,013 | 3/1982 | Cabestany | 528/501 |
| 4,581,444 | 4/1986 | Fujino | 528/487 |
| 4,816,558 | 3/1989 | Rauch et al. | 528/501 |
| 4,824,901 | 4/1989 | Alexander et al. | 524/555 |
| 5,274,055 | 12/1993 | Honig et al. | 524/555 |
| 5,462,978 | 10/1995 | Penzel et al. | 523/342 |

FOREIGN PATENT DOCUMENTS

| | | |
|---|---|---|
| 0 084 837 | 8/1983 | European Pat. Off. . |
| 0 629 650 | 12/1994 | European Pat. Off. . |
| 1 013 073 | 8/1957 | Germany . |

OTHER PUBLICATIONS

Patent Abstracts of Japan, vol. 95, No. 5, Jun. 30, 1995, JP 07–053728, Feb. 28, 1995.

*Primary Examiner*—Tae Yoon
*Attorney, Agent, or Firm*—Oblon, Spivak, McClelland, Maier & Neustadt, P.C.

[57] ABSTRACT

Polymer powders which are redispersible in an aqueous medium are prepared by drying an aqueous polymer dispersion whose polymer particles dispersed in the aqueous medium have a positive or a negative electric surface charge, with the addition of a water-soluble polyelectrolyte as a drying assistant, the electric charge of the polyion being opposite to the electric surface charge of the disperse polymer particles.

27 Claims, No Drawings

PREPARATION OF POLYMER POWDERS WHICH ARE REDISPERSIBLE IN AN AQUEOUS MEDIUM

The present invention relates to a process for the preparation of polymer powders, which are redispersible in an aqueous medium, by drying an aqueous polymer dispersion whose polymer particles dispersed in an aqueous medium have a positive or a negative electric surface charge, with the addition of a drying assistant.

The present invention furthermore relates to the polymer powders which are redispersible in water and obtainable by carrying out the process, and to the use of these powders (for example as additives in mineral binders or as binders of synthetic resin renders) and to aqueous polymer dispersions required for the preparation of the powders and containing added polyelectrolyte.

Aqueous polymer dispersions (latices) are generally known. They are fluid systems which contain polymer coils consisting of a plurality of intertwined polymer chains (ie. polymer particles) as the disperse phase in an aqueous dispersing medium. The diameter of the polymer particles is frequently from 10 to 1000 nm. As in the case of polymer solutions where the solvent is evaporated, aqueous polymer dispersions have the potential to form polymer films when the aqueous dispersing medium is evaporated, and are therefore used in particular as binders, adhesives and coating materials (their use as binders for synthetic resin renders or highly pigmented interior coating materials is particularly noteworthy).

The size of the polymer particles present as the disperse phase in aqueous polymer dispersions is of key importance for the properties of said dispersions. In particular, properties such as the viscosity of the aqueous polymer dispersion or the gloss of their films are dependent on the diameter of the disperse polymer particles or, more precisely, on the diameter distribution of the disperse polymer particles (with identical polymers, films of small polymer particles have, as a rule, a higher gloss; a broad distribution of the diameters generally results in lower viscosity of the aqueous polymer dispersion; dispersions of small polymer particles have, as a rule, a greater pigment binding capacity, etc.).

However, the disadvantage of the aqueous polymer dispersion as an application form is that its place of preparation generally differs from the place of use. However, its transfer from the place of preparation to the place of use always implies transporting the dispersing medium water, which is readily available everywhere, in addition to transporting the polymer which in the end essentially alone constitutes the polymer film. Furthermore, aqueous polymer dispersions may be added to mineral binders for modifying the latter only at the place of use, since they otherwise cure before use.

A desirable form of any aqueous polymer dispersion is therefore that of its polymer which is redispersible on addition of water.

Polymers which are redispersible on addition of water are obtainable in principle by drying the aqueous polymer dispersions, whereupon they are usually obtained in powder form. Examples of such drying processing are freeze-drying and spray-drying. The latter method, in which the polymer dispersion is sprayed and dewatered in a warm air stream, is particularly advantageous for producing large amounts of powder. The drying air and the spray dispersion are preferably fed cocurrent through the dryer (cf. for example EP-A 262 326 or EP-A 407 889).

While the drying of polymer solutions is usually completely reversible, a disadvantage of polymer powders produced by drying aqueous polymer dispersions is that their redispersibility on addition of water is as a rule not completely satisfactory in that the polymer particle diameter distribution resulting in the case of redispersion generally differs from that in the aqueous starting dispersion (primary particle diameter distribution).

This state of affairs is due to the fact that aqueous polymer dispersions, in contrast to polymer solutions, do not form thermodynamically stable systems. Rather, the system attempts to reduce the size of the polymer/dispersing medium interface by combining small primary particles to form larger secondary particles (eg. specks, coagulum), which, in the state of a disperse phase in the aqueous medium, can be prevented for a relatively long time by adding dispersants.

Very generally, dispersants are those substances which are capable of stabilizing the disperse polymer/aqueous dispersing medium interface. As a rule, they are water-soluble substances whose total amount can be divided into two groups: a) protective colloids; b) emulsifiers. The latter in turn can be divided into: a) anionic emulsifiers; b) cationic emulsifiers; c) nonionic emulsifiers. The stabilizing effect of protective colloids is primarily due to a steric and/or electrostatic shielding of the disperse polymer particles, which are enveloped by the protective colloid. These are as a rule substances whose relative molecular weight is above 1500. They may be chemically or only physically bound to the disperse polymer particles.

The stabilizing effect of emulsifiers whose relative molecular weight is as a rule<1500 is due to the fact that, owing to their amphiphilic structure (polar moiety—nonpolar moiety), they are capable of reducing the interfacial tension of the polymer/aqueous dispersing medium interface. If the polar moiety is a cationic group, the term cationic emulsifier is used. If the polar moiety is an anionic group, the substance is an anionic emulsifier. In the case of a nonionic polar moiety, the term nonionic emulsifier is used. In contrast to protective colloids, emulsifiers are capable of forming micelles in water. Furthermore, their characteristics are such that, when added to water at 25° C. and 1 atm, they reduce the surface tension of the water as a rule by at least 25% on reaching the critical micelle formation concentration. Suitable opposite ions in anionic emulsifiers are in particular alkali metal ions, alkaline earth metal ions and ammonium ions. In cationic emulsifiers, the hydroxide anion, halide anions and $NO_3^-$ are particularly suitable.

The polymer particles which form the disperse phase of aqueous polymer dispersions stabilized by means of cationic emulsifiers have a corresponding positive surface charge. Aqueous polymer dispersions stabilized by means of anionic emulsifiers contain polymer particles having a negative surface charge. As in the case of the protective colloids, the emulsifiers too may be bound chemically or only physically to the disperse polymer particles. Of course, protective colloids and emulsifiers may also be used in combination for stabilizing the aqueous polymer dispersions.

A further possibility of providing the surface of polymer particles dispersed in an aqueous medium with electric charges is to incorporate ionizable components into the polymer. These are understood as meaning, for example, chemical compounds which, as, for example, α,β-monoethylenically unsaturated carboxylic acids, are capable of forming electric charges by changing the pH of the aqueous dispersing medium or dissociate into ions in the presence of water. If the aqueous polymer dispersion is one which is produced directly as the disperse phase by free radical aqueous emulsion polymerization of monomers having at least one ethylenically unsaturated group (primary dispersion), the surface of the disperse polymer particles may also have positive or negative electric charges originating from the free radical polymerization initiator. Appropriate molecular weight regulators (cf. for example JP-A 7/53728) are a further source of charge. In the case of a secondary dispersion of a polymer, the disperse polymer is produced as a rule in solution (for example by free radical polymerization, polycondensation or polyaddition) and subsequently converted into an aqueous polymer dispersion. Here too, the desired electric surface charge can be generated by the conventional choice of initiator, regulator and, in the case of conversion, dispersant.

Whether the polymer particles of an aqueous polymer dispersion which are present as the disperse phase have a negative or a positive surface charge can be determined in a manner known per se by investigating their electrophoretic mobility. Most aqueous polymer dispersions have polymer particles with an anionic surface charge (anionically stabilized aqueous polymer dispersion). They are just as familiar to a person skilled in the art as are cationically stabilized aqueous polymer dispersions.

During the drying of aqueous polymer dispersions, however, the separating effect of the dispersants is frequently no longer sufficient and a certain degree of irreversible secondary particle formation takes place, ie. the secondary particles are retained as such during redispersing and adversely affect the performance characteristics of the aqueous polymer dispersion obtained in the course of the redispersing.

It has long been known that there are substances which, when added to aqueous polymer dispersions, produce the phenomenon of irreversible secondary particle formation during drying. These substances are collectively known by the term drying assistants. They are widely known, in particular as spray assistants, since spray-drying promotes the formation of irreversible secondary particles to a particular extent. At the same time, they generally reduce the formation of polymer coating adhering to the dryer wall during spray-drying and thus increase the powder yield.

According to TIZ-Fachberichte 109 No. 9 (1985), 698 et seq., the drying assistants used to date are water-soluble substances which, during drying, form a matrix in which the water-insoluble primary polymer particles surrounded by dispersant are embedded. The matrix surrounding and protecting the primary polymer particles counteracts irreversible secondary particle formation. In general, the result is reversible formation of secondary particles (agglomerates having a size of, typically, from 50 to 250 $\mu$m) which comprise a large number of primary polymer particles separated from one another by the drying assistant matrix. On redispersing with water, the matrix dissolves again and the original primary polymer particles surrounded by dispersant are essentially obtained again. In many cases, finely divided antiblocking agents, such as finely divided quartz powder, are also added to the reversibly formed secondary particles and act as spacers between the redispersible agglomerates and, for example, counteract their caking during storage under the pressure of their own weight.

German Published Application DAS 2,238,903 and EP-A 576 844 recommend the use of poly-N-vinylpyrrolidone as such a drying assistant. EP-A 78 449 recommends copolymers of from 20 to 70% by weight of vinylpyrrolidone and from 30 to 80% by weight of vinyl acetate, water-soluble alkali metal and/or alkaline earth metal salts of a naphthalenesulfonic acid/formaldehyde condensate and mixtures thereof as drying assistants. EP-A 601 518 recommends the use of polyvinyl alcohol as a drying assistant for anionically stabilized aqueous polyacrylate dispersions. Polyvinyl alcohol is also recommended by U. Rietz in Chemie u. Technologie makromolekularer Stoffe (FH-Texte FH Aachen) 5 (1987), 85, as a drying assistant for aqueous polymer dispersions.

EP-A 467 103 relates to the preparation of polymer powders which are redispersible in an aqueous medium, by spray-drying of anionically stabilized aqueous polymer dispersions after the addition of a copolymer of from 50 to 80 mol % of an olefinically unsaturated mono- or dicarboxylic acid and from 20 to 50 mol% of a $C_3$–$C_{12}$-alkene and/or styrene as a drying assistant.

EP-A 629 650 recommends the use of polymers containing olefinically unsaturated sulfonic acids as polymerized units, as spray assistants in spray-drying of anionically stabilized aqoeus polymer dispersions.

However, the disadvantage of the prior art drying assistants is that they are not completely satisfactory in the drying of aqueous polymer dispersions. In particular, the diameter distribution of the primary polymer particles is as a rule no longer achieved on redispersing in an aqueous medium (cf. for example TIZ-Fachberichte, 109 No. 9 (1985), 699). The amount of coagulum remaining in the filter when the aqueous redispersion is filtered is an indication of the state of affairs.

JP-A 7/53728 relates to a process for spray-drying of ionically stabilized aqueous polymer dispersions after an aqueous dispersion of water-insoluble finely divided inorganic particles which have a surface charge opposite the surface charge of the disperse polymer particles has been added as the drying assistant. Said particles are electrostatically adsorbed onto the surface of the disperse polymer particles and, during the drying of the aqueous polymer dispersion, thus form a protective layer which is both described as promoting the redispersibility and has primarily an antiblocking action. While the antiblocking action is demonstrated by examples, this does not apply to the redispersibility. The disadvantage of the procedure of JP-A 7/93728 is that the diameter of the finely divided inorganic particles must bear a certain relationship with the diameter of the polymer particles. This presents problems, particularly in the case of very finely divided aqueous polymer dispersions to be dried and in the case of aqueous polymer dispersions having a very broad diameter distribution.

EP-A 262 326 relates to a specific spray-drying process for aqueous polymer dispersions which attempts to manage without the presence of drying assistants. However, this procedure too is not completely satisfactory with respect to the redispersibility of the resulting polymer powder.

It is an object of the present invention to provide a process for the preparation of polymer powders, which are redispersible in an aqueous medium, by drying an aqueous polymer dispersion whose polymer particles dispersed in the aqueous medium have a positive or a negative electric surface charge, with the addition of a drying assistant, which process does not have the disadvantages of the prior art processes.

We have found that this object is achieved by a process for the preparation of polymer powders, which are redispersible in an aqueous medium, by drying an aqueous polymer dispersion whose polymer particles dispersed in the aqueous medium have a positive or a negative electric surface charge, with the addition of a drying assistant, wherein a polyelectrolyte which, in its form dissociated into a polyion and opposite ions, is soluble in the aqueous dispersing medium is added as a drying assistant to the aqueous polymer dispersion to be dried, the electric charge of the polyion being opposite to the electric surface charge of the dispersed polymer particles.

According to Römpp Chemie Lexikon Pl-S, Thieme Verlag, 9th edition (1992), page 3526, the term polyelectrolyte is to be understood here as polymers having groups which can undergo ionic dissociation in an aqueous medium and may be a part of or a substituent of the polymer chain, the number of groups which can undergo ionic dissociation being sufficiently large for the polymers in dissociated form to be completely soluble in water, ie. a polyelectrolyte dissociates in the aqueous medium into a polyion and the corresponding opposite ions. A distinction is essentially made between two groups of polyelectrolytes, ie. polyacids and polybases. On dissociation, polyacids form polyanions with elimination of protons. The dissociation of polyacids in an aqueous medium can be promoted by adding bases to the aqueous medium. Aqueous solutions of polyacid salts are formed, ie. typical opposite ions of polyanions are the alkali metal ions (Na⊕, K⊕, Li⊕, Rb⊕, Cs⊕), alkaline earth metal ions (eg. $Ca^{2+}$⊕, $Mg^{2+}$⊕), the H⊕ion, the $NH_4$⊕ ion and the ammonium ions of nitrogen bases differing from $NH_3$ (amines).

Polybases contain, as pre-ionic groups, for example those which are capable of taking up protons as a result of reactions with acids to form salts. A possible alternative to protonation is alkylation. Typical opposite ions of resulting polycations are the halide ions (Cl⊖, Br⊖, I⊖), $CO_3^{2-}$⊖, $SO_4^{2-}$⊖, $CH_3$—$OSO_3$⊖ and $CH_3$—$CH_2$—$OSO_3$⊖. Polyions (cations and anions) may be both inorganic and organic polymers. According to the invention, polyelectrolytes based on organic polymers are preferred. The number average molecular weight of polyelectrolytes suitable according to the invention may be, for example, from 1000 to $3 \cdot 10^6$ or more, or from 2000 to $5 \cdot 10^5$ or from 5000 to $10^5$ or from 7500 to 50,000 or from 10,000 to 25,000.

Polyelectrolytes and their preparation are known to a person skilled in the art (cf. for example U.S. Pat. No. 3,205,187, U.S. Pat. No. 4,038,233, EP-A 246 580, EP-A 544 158, EP-A 629 650, EP-A 467 103, Oosawa, Polyelektrolytes, New York: Marcel Dekker 1971, etc.).

Their solubility in water at b 25° C. and 1 atm is, as a rule, ≧1 g per 100 g of water, frequently ≧10 g per 100 g of water and often ≧25 g per 100 g of water.

Polyelectrolytes to be used according to the invention are obtainable in a particularly simple manner by free radical polymerization of monomers having at least one ethylenically unsaturated group. All that is important is that at least a part of the monomers to be polymerized have groups which can undergo ionic dissociation in an aqueous medium. As a rule, the amount of the monomers which are to be polymerized and have groups which can undergo ionic dissociation in the aqueous medium is at least 5, frequently at least 10 or at least 20 or at least 40, in many cases at least 60, often at least 80, or from 90 to 100, % by weight, based on the total amount of monomers to be polymerized.

For polycationic polyelectrolytes, particularly suitable monomers having groups which can undergo ionic dissociation in an aqueous medium are those which have a tetravalent nitrogen (quaternary salts).

EXAMPLES

Compounds of the general formula (I)

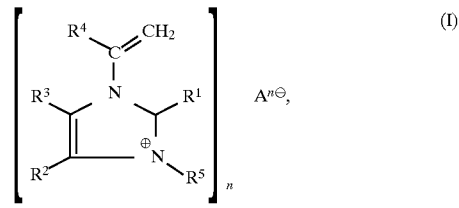

where $A^{n\ominus}$ is $Cl^\ominus$, $Br^\ominus$, $I^\ominus$, $SO_4^{2\ominus}$, $CO_3^{2\ominus}$, $CH_3$—$OSO_3^\ominus$ or $CH_3$—$CH_2$—$OSO_3^\ominus$, $R^1$ to $R^5$, independently of one another, are each $C_1$–$C_{20}$-alkyl, benzyl or H and n is 1 or 2, compounds of the general formula (II)

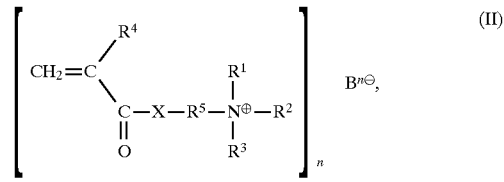

where

X is NH or O, $R^4$ is H or $C_1$–$C_{20}$-alkyl, $R^5$ is $C_1$–$C_{20}$-alkylene, $R^1$, $R^2$ and $R^3$, independently of one another, are each $C_1$–$C_{20}$-alkyl, $B^{n\ominus}$ is $Cl^\ominus$, $Br^\ominus$, $I^\ominus$, $SO_4^{2\ominus}$, $CO_3^{2\ominus}$, $CH_3$—$OSO_3^\ominus$ or $CH_3$—$CH_2$—$OSO_3^\ominus$ and n is 1 or 2, compounds of the general formula (III)

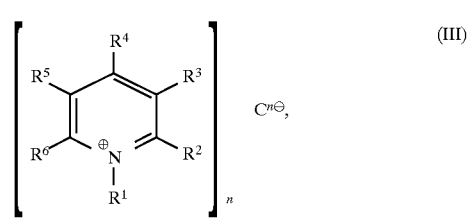

where $R^1$ to $R^6$, independently of one another, are each H or $C_1$–$C_{20}$-alkyl, but one of the radicals $R^1$ to $R^6$ is —CH=$CH_2$, $C^{n\ominus}$ is $Cl^\ominus$, $Br^\ominus$, $I^\ominus$, $SO_4^{2\ominus}$, $CO_3^{2\ominus}$, $CH_3$—$OSO_3^\ominus$ or $CH_3$—$CH_2$—$OSO_3^\ominus$, and n is 1 or 2, compounds of the general formula (IV)

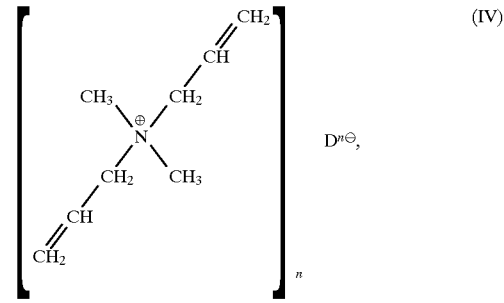

where $D^{n\ominus}$ is $Cl^{\ominus}$, $Br^{\ominus}$, $I^{\ominus}$, $SO_4^{2\ominus}$, $CO_3^{2\ominus}$, $CH_3{-}OSO_3^{\ominus}$ or $CH_3{-}CH_2{-}OSO_3^{\ominus}$ and n is 1 or 2.

For polyanionic polyelectrolytes, examples of monomers having groups which can undergo ionic dissociation are:

salts (in particular the alkali metal and ammonium salts) of α,β-monoethylenically unsaturated carboxylic acids of 3 to 6 carbon atoms, vinylsulfonic acid and its salts (in particular the alkali metal and ammonium salts), compounds of the general formula (V)

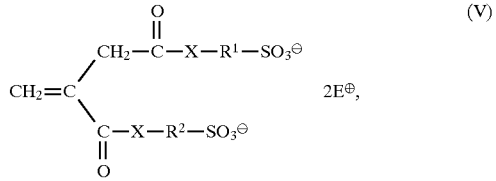

where $R^1$ and $R^2$ are each $C_1$–$C_{10}$-alkylene, x is O or NH and, $E^{\oplus}$ is an alkali metal ion, $NH_4^{\oplus}$ or (alkaline earth metal ion)$_{1/2}$, compounds of the general formula (VI)

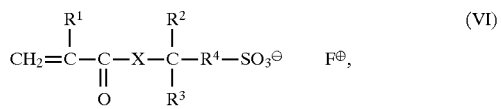

where $R^1$, $R^2$ and $R^3$ are each $C_1$–$C_3$-alkyl, $R^4$ is $C_1$–$C_5$-alkylene, X is O or NH and $F^{\oplus}$ is an alkali metal ion, $NH_4^{\oplus}$ or (alkaline earth metal ion)$_{1/2}$, compounds of the general formulae (VII) and (VIII)

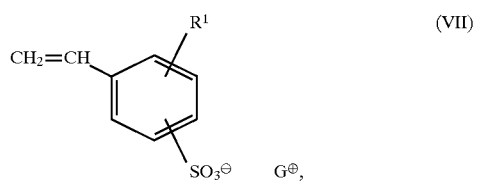

where $R^1$ is $C_1$–$C_5$-alkyl and $G^{\oplus}$ is an alkali metal ion, $NH_4^{\oplus}$ or (alkaline earth metal)$_{1/2}$.

Very generally, salts of monomers having sulfonic acid groups and containing at least one ethylenically unsaturated group are particularly suitable for the preparation of polyanionic polyelectrolytes. The alkali metal ion is in partiuclar $Li^{\oplus}$, $Na^{\oplus}$, $K^{\oplus}$, $Rb^{\oplus}$ or $Cs^{\oplus}$. The alkaline earth metal ion is in particular $Ca^{2\oplus}$ or $Mg^{2\oplus}$.

Suitable comonomers of the monomers having groups which can undergo ionic dissociation in an aqueous medium are all other monomers having at least one ethylenically unsaturated group. They are to be referred to below as nonionic monomers. These are, for example, monomers such as olefins (in particular $C_3$–$C_{12}$-alkenes), eg. ethylene or propylene, vinylaromatic monomers, such as styrene, α-methylstyrene, o-chlorostyrene or vinyltoluenes, esters of vinyl alcohol and alkanecarboxylic acids of 1 to 18 carbon atoms, such as vinyl acetate, vinyl propionate, vinyl n-butyrate, vinyl laurate and vinyl stearate, esters of α,β-monoethylenically unsaturated monocarboxylic acids, preferably of 3 to 6 carbon atoms, such as acrylic acid and methacrylic acid, with alkanols, of, in general, 1 to 12, frequently 1 to 8, mostly 1 to 4, carbon atoms, in particular methyl, ethyl, n-butyl, isobutyl, tert-butyl and 2-ethylhexyl acrylate and methacrylate, diesters of α,β-monoethylenically unsaturated dicarboxylic acids of up to 6 carbon atoms, such as fumaric acid, itaconic acid and maleic acid, with alkanols of, in general, 1 to 12, frequently 1 to 8, mostly 1 to 4, carbon atoms, such as dimethyl maleate or di-n-butyl maleate, the nitriles and amides of the abovementioned α,β-monoethylenically unsaturated carboxylic acids, such as acrylonitrile and acrylamide, and conjugated $C_4$–$C_8$-dienes, such as 1,3-butadiene and isoprene. However, other suitable comonomers are vinylamides, such as N-vinylpyrrolidone, N-vinylcaprolactam, N-vinylformamide, N-vinylacetamide or N-methyl-N-vinylacetamide, hydroxyalkyl acrylates and hydroxyalkyl methacrylates where the hydroxyalkyl radical is of 2 to 4 carbon atoms, such as hydroxyethyl (meth)acrylate or hydroxypropyl (meth)acrylate, polyethylene glycol (meth) acrylates having 2 to 50 ethylene oxide units, allyl esters of alkanecarboxylic acids of 1 to 18 carbon atoms and N-vinyllactams of the general formula (IX)

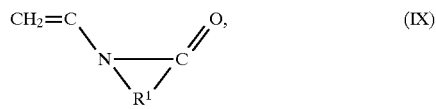

where $R^1$ is $C_3$–$C_8$-alkylene.

The free radical polymerization for the preparation of polyelectrolytes to be used according to the invention is advantageously carried out in solution. Examples of suitable solvents are water, methanol, ethanol, isopropanol and other lower alcohols, but also other organic solvents. Polymerization is usually effected in water-miscible solvents. As a rule, the polymerization is carried out in the presence of from 0.1 to 2% by weight, based on the amount of monomers to be polymerized, of free radical initiators. The polymerization temperature is frequently from 40° to 100° C.

Peroxides, eg. hydrogen peroxide or peroxodisulfuric acid and its salts (alkali metal or ammonium salts), and organic peroxides, such as tert-butyl hydroperoxide, dicyclohexyl peroxodicarbonate, dibenzoyl peroxide, dilauroyl peroxide, tert-butyl perpivalate and tert-butyl per-2-ethylhexanoate, may be used as free radical initiators. It is of course also possible to use azo compounds, such as 2,2'-azobis(2-methylbutyronitrile), 2,2'-azobisisobutyrodinitrile, 2,2'-azobis(2-amidinopropane) hydrochloride and 2,2'-azobis(2, 4-dimethylvaleronitrile), or redox initiator systems comprising a peroxide and a reducing agent, such as sodium formaldehyde sulfoxylate. The choice of the initiator depends of course on, inter alia, the polymerization temperature. The molecular weight of the polyelectrolyte can be regulated in a manner known per se by adding molecular weight regulators. Particularly suitable regulators are lower alcohols (which can simultaneously act as solvents). However, other compounds usually used for this purpose, such as sulfur compounds, eg. 2-mercaptoethanol, butyl mercaptan, dodecyl mercaptan, thioglycolic acid, thioacetic acid or thiolactic acid, or halogen compounds such as carbon tetrachloride, may also be used as molecular weight regulators. As a rule, the monomers to be polymerized are added continuously to the polymerization vessel, as a rule as a solution in the solvent, at the rate of the conversion in the polymerization. By drying the resulting resulting polyelectrolyte solutions, the polyelectrolytes can in principle be isolated. In the novel process, however, it is also possible to use the polyelectrolyte solutions as such.

In the novel process, it is important that the coagulation of the polymer dispersion which usually occurs on addition of a polycationic (polyanionic) polyelectrolyte to an anionically (cationically) stabilized aqueous polymer dispersion is avoided. This is achieved by not stirring the polyelectrolyte or its solution into the aqueous polymer dispersion but adopting the converse procedure and stirring the aqueous polymer dispersion into a solution of the polyelectrolyte (cf. U.S. Pat. No. 5,045,576, U.S. Pat. No. 4,038,233, U.S. Pat. No. 3,205,187 and EP-A 305 039). As a rule, it is necessary that the total polyionic charge of the polyelectrolyte solution is capable of more than neutralizing the total surface charge of the polymer particles in the aqueous polymer dispersion, which surface charge has the opposite sign.

Our own electrophoretic investigations show that the polyanions (polycations) of the polyelectrolyte solution are electroadsorbed onto a cationic (anionic) polymer particle surface and, in the case of an excess total polyionic charge, result in charge reversal on the polymer particle surface, ie., in contrast to the conventional drying assistants of the prior art, it is possible in the novel process to apply a second, polycationic (polyanionic) protective layer along the anionically (cationically) stabilized polymer particles at as early a stage as the disperse phase in the aqueous medium, which protective layer counteracts irreversible secondary particle formation during drying of the aqueous polymer dispersion and in particular, owing to its water solubility, results in virtually perfect redispersibility in an aqueous medium. By repeated successive charge reversal using polyions having signs of their ionic charge which alternate in the charge reversal sequence, protective layers having a very wide range of thicknesses can be produced in an appropriate manner. By finally using the procedure of JP-A 7/53728 (application of finely divided insoluble inorganic particles to the polymer particle surface), it is possible in the final drying to obtain polymer powders which simultaneously exhibit both excellent redispersibility in an aqueous medium and resistance to blocking.

By electrophoretic investigation, it is possible to monitor the charge reversal on the polymer particle surface in detail. The redispersibility is as a rule optimized when the amount, based on the dispersed polymer, of polyelectrolyte added is such that the charge reversal on the polymer particle surface just reaches its maximum.

As a rule, the novel drying is carried out by spray-drying the aqueous polymer dispersion at an inlet temperature $T_I$ of the warm air stream of from 100° to 200° C., preferably from 120° to 160° C., and an outlet temperature $T_o$ of the warm air stream of from 30° to 90° C., preferably from 50° to 70° C. Spraying of the aqueous polymer dispersion in the warm air stream can be effected, for example, by means of one-material or multimaterial nozzles or by means of a rotating disk. Deposition of the polymer powders is usually effected with the use of cyclones or filter separators. The sprayed aqueous polymer dispersion and the warm air stream are preferably fed in parallel.

Against this background, one embodiment of the present invention comprises using those polyelectrolytes as drying assistants which are prepared by incorporating, as polymerized units, nonionic monomers whose homopolymers have a glass transition temperature (midpoint temperature, ASTM D 3418-82) above 50° C. at high molecular weight.

As stated above, the relative molecular weight of the polyelectrolytes to be used according to the invention may extend over a wide range. A measure of the average molecular weight of a polyelectrolyte is its K value at 25° C. in aqueous solution. The K value is a relative viscosity number which is determined similarly to DIN 53 726. Here, it is based on the flow velocity of the pure solvent relative to the flow velocity of the solvent containing a defined amount of polyelectrolyte in solution (cf. also Cellulosechemie, 13 (1932), 58–64, and Kirk-Othmer, Encyclopedia of Chemical Technology, Vol. 23, pages 967–968). A high K value corresponds to a high average molecular weight.

According to the invention, examples of suitable polyelectrolytes are those whose K value in 0.5 molar aqueous NaCl solution as solvent at a polyelectrolyte content of 0.1% by weight is from 20 to 350, preferably from 30 to 200. Other polyelectrolytes which are suitable according to the invention are those whose K value in water as solvent at a polyelectrolyte content of 1% by weight is from 15 to 150, preferably from 25 to 120.

An advantage of the novel drying process is that the affinity between polymer particle surface and polyanion is based predominantly on electrostatic interaction. In a corresponding manner, the novel drying process can be used essentially independently of the chemical peculiarity of the disperse polymer. As a rule, it proves advantageous if the electric charge carriers which play a role in stabilizing the disperse phase of the aqueous polymer dispersion before the addition of the polyelectrolyte are bound not only physically but also chemically to the disperse polymer (for example, chemical bonding by grafting in free radical aqueous emulsion polymerization onto cationic or ionic protective colloid).

Another advantage of the novel drying process is that the polyelectrolyte to be added need not be tailored to the diameter of the polymer particles dispersed in the aqueous polymer dispersion. A measure of the mean polymer particle diameter is the light transmittance of the aqueous polymer dispersion determined at 25° C. (LT value, determined in the aqueous polymer dispersion diluted to a solids content of 0.01% by weight, relative to pure water, using white light and with a path length of 2.5 cm).

In principle, the novel process can be used both for drying aqueous ionically stabilized primary polymer dispersions and for drying aqueous ionically stabilized secondary polymer dispersions.

The novel procedure proves particularly advantageous for drying aqueous polymer dispersions whose films have glass transition temperatures of $\leq 50°$ C. or $\leq 25°$ C. or $\leq 0°$ C. As a rule, the glass transition temperature of the dispersed polymers will be $\geq -60°$ C. or $\geq -40°$ C. or $\geq 20°$ C.

This means that the novel process is suitable for drying aqueous polymer dispersions whose dispersed polymer in the form obtained by free radical polymerization is composed of from 70 to 100% by weight of esters of acrylic and/or methacrylic acid with alkanols of 1 to 12 carbon atoms and/or styrene or from 70 to 100% by weight of styrene and/or butadiene or from 40 to 100% by weight of vinyl chloride and/or vinylidene chloride or from 40 to 100% by weight of vinyl acetate, vinyl propionate and/or ethylene.

In other words, the novel process is suitable for drying ionically costabilized aqueous polymer dispersions whose disperse polymer in the form obtained by free radical polymerization comprises monomers having at least one ethylenically unsaturated group, such as olefins, eg. ethylene, vinylaromatic monomers, such as styrene, α-methylstyrene, o-chlorostyrene or vinyltoluenes, vinyl and vinylidene halides, such as vinyl and vinylidene chloride, esters of vinyl alcohol and monocarboxylic acids of 1 to 18 carbon atoms, such as vinyl acetate, vinyl propionate, vinyl n-butyrate, vinyl laurate and vinyl stearate, and commercially available monomers VEOVA® 9–11 (VEOVA X is a trade name of Shell and represents vinyl esters of carboxylic acids which are also referred to as Versatic® X acids), esters of α,β-monoethylenically unsaturated mono- and dicarboxylic acids, preferably of 3 to 6 carbon atoms, in particular acrylic acid, methacrylic acid, maleic acid, fumaric acid and itaconic acid, with alkanols of in general 1 to 12, preferably 1 to 8, and in partiuclar 1 to 4, carbon atoms, in particular methyl, ethyl, n-butyl, isobutyl and 2-ethylhexyl acrylate and methacrylate, dimethyl maleate or n-butyl maleate, nitriles of α, β-monoethylenically unsaturated carboxylic acids, such as acrylonitrile, and conjugated $C_{4-8}$-dienes, such as 1,3-butadiene and isoprene. The stated monomers are as a rule the main monomers, which together usually account for more than 50% by weight, based on the total amount of the polymerized monomers. Monomers which, when polymerized by themselves, usually give homopolymers which have a high water solubility are usually incorporated as polymerized units only as modifying monomers in amounts of less than 50, as a rule from 0.5 to 20, preferably from 1 to 10, % by weight, based on the total amount of the monomers to be polymerized.

Examples of such monomers are α,β-monoethylenically unsaturated mono- and dicarboxylic acids of 3 to 6 carbon atoms and amides thereof,.eg. acrylic acid, methacrylic acid, maleic acid, fumaric acid, itaconic acid, acrylamide and methacrylamide, and vinylsulfonic acid and water soluble salts thereof and N-vinylpyrrolidone. Monomers which usually increase the internal strength of the films of the aqueous polymer dispersion are incorporated as polymerized units as a rule likewise only in minor amounts, in general from 0.5 to 10% by weight, based on the total amount of the monomers to be polymerized. Such monomers usually have an epoxy, hydroxyl, N-methylol or carbonyl group or at least two nonconjugated ethylenically unsaturated double bonds. Examples of these are N-alkylolamides of α,β-monoethylenically unsaturated carboxylic acids of 3 to 10 carbon atoms and esters thereof with alcohols of 1 to 4 carbon atoms, among which N-methylolacrylamide and N-methylolmethacrylamide are very particularly preferred, monomers having two vinyl radicals, monomers having two vinylidene radicals and monomers having two alkenyl radicals. The diesters of dihydric alcohols with α,β-monoethylenically unsaturated monocarboxylic acids are particularly suitable, and among these in turn acrylic acid and methacrylic acid are preferably used. Examples of such monomers having two nonconjugated ethylenically unsaturated double bonds are alkylene glycol diacrylates and dimethacrylates, such as ethylene glycol diacrylate, 1,3-butylene glycol diacrylate, 1,4-butylene glycol diacrylate and propylene glycol diacrylate, divinylbenzene, vinyl methacrylate, vinyl acrylate, allyl methacrylate, allyl acrylate, diallyl maleate, diallyl fumarate, methylenebisacrylamide, cyclopentadienyl acrylate and triallyl cyanurate. Of particular importance in this context are also $C_1$–$C_8$-hydroxyalkyl methacrylates and acrylates, such as n-hydroxyethyl, n-hydroxypropyl and n-hydroxybutyl acrylate and methacrylate, and compounds such as diacetoneacrylamide and acetylacetoxyethyl acrylate and methacrylate. In addition to monomers having unsaturated double bonds, molecular weight regulators, such as tert-dodecyl mercaptan and 3-mercaptopropyltrimethoxysilane, may also be incorporated as polymerized units in minor amounts, usually from 0.01 to 2% by weight, based on the monomers to be polymerized.

In particular, the novel process can be used in the case of aqueous polymer dispersions which are to be dried and whose polymer present as the dipserse phase, in the form obtained by free radical polymerization, is composed of A) from 80 to 100% by weight of at least one monomer selected from the group consisting of styrene, α-methylstyrene, vinyltoluenes, esters of α,β-monoethylenically unsaturated carboxylic acids of 3 to 6 carbon atoms and alkanols of 1 to 12 carbon atoms, butadiene and vinyl and allyl esters of alkanecarboxylic acids of 1 to 12 carbon atoms and B) from 0 to 20% by weight of other monomers having at least one ethylenically unsaturated group.

Possible monomers A are, for example, n-butyl acrylate, 2-ethylhexyl acrylate, methyl methacrylate and styrene.

Possible monomers B are acrylamide, methacrylamide, acrylic acid, acrylonitrile, methacrylonitrile, 2-acryloamido-2-methylpropanesulfonic acid, vinylpyrrolidone, hydroxyethyl acrylate, hydroxymethyl acrylate, hydroxypropyl acrylate, hydroxypropyl methacrylate, quaternized vinylimidazole, N,N-dialkylaminoalkyl (meth)acrylates, N,N-dialkylaminoalkyl(meth)acrylamides, trialkylammoniumalkyl (meth)acrylates and trialkylammoniumalkyl (meth)acrylamides.

Examples of suitable protective colloids and/or emulsifiers which stabilize the disperse phase are all those disclosed in DE-A 42 13 965. The same applies to the polymerization initiators. In the novel process, the solids volume concentration of the aqueous polymer dispersion to be dried is as a rule from 10 to 75, frequently from 20 to 65, in general from 30 to 50, % by volume, based on the volume of the aqueous polymer dispersion.

Finally, it should be pointed out that, in the use according to the invention, drying assistants additionally known per se (for example, polyvinyl alcohol, polyvinylpyrrolidone, napthalenesulfonic acid/formaldehyde condensates, phenylsulfonic acid/formaldehyde condensates, homopolymers of 2-acrylamido-2-methylpropanesulfonic acid, etc.) may be present in addition to the polyelectrolytes to be used according to the invention as drying assistants. The same applies to anticaking agents, such as finely divided silica, which are frequently present (as a rule sprayed in separately) during spray-drying, in order to prevent caking of the polymer powder during storage.

The polymer powders which result when the novel process is carried out and which are redispersible in an aqueous medium are suitable, with the addition of water, as binders in hydraulically setting materials, paints, finishes, adhesives, coating materials (in particular for paper) and synthetic resin renders, as described in EP-A 629 650.

EXAMPLES

I. Preparation of anionically stabilized aqueous polymer dispersions DA–DF to be dried General preparation method:

A mixture of

| | |
|---|---|
| 150 g | of water, |
| 5.6 g | of a 20% strength by weight aqueous solution of an ethoxylated p-isooctylphenol (degree of ethoxylation: 25, emulsifier), |
| 0.48 g | of a 35% strength by weight aqueous solution of the sodium salt of the half-ester of sulfuric acid with ethoxylated p-isooctylphenol (degree of ethoxylation: 25, emulsifier), |
| 3.9 g | of a 10% strength by weight aqueous formic acid solution, |
| 1.7 g | of sodium bicarbonate, pH buffer, and |
| 3.4 g | of a 20% strength by weight aqueous polyacrylamide solution, protective colloid, | was initially taken in a polymerization vessel and heated to 90° C.

While maintaining the temperature of 90° C. and beginning at the same time, but at spacially separate points, a feed 1 was metered continuously into this mixture in the course of 2 hours, and a feed 2 in the course of 2.5 hours. Thereafter, the reaction mixture was stirred for a further 120 minutes at 90° C. and then cooled to 60° C. After the addition of a solution of 1.1 g of tert-butyl hydroperoxide in 5.5 g of water, a solution of 0.6 g of sodium formaldehyde sulfoxylate in 15 g of water was fed in continuously in the course of 1 hour while maintaining the temperature of 60° C., and stirring was then continued for a further 0.5 hour at 60° C. 15 minutes after the end of stirring, the mixture was cooled to 25° C. and neutralized with 3.5 g of a 10% strength by weight aqueous ammonia solution. Finally, it was filtered through a sieve having a mesh size of 250 μm. After the filtration, the solids content, the LT value and the pH of the aqueous dispersion medium (glass electrode) were determined. The results obtained are shown in Table 1.

Feed 1: an aqueous emulsion of

| | Feed 1: an aqueous emulsion of |
|---|---|
| 560 g | of monomer mixture A to F, |
| 8.4 g | of a 20% strength by weight aqueous solution of ethoxylated p-isooctylphenol (degree of ethoxylation: 25, emulsifier), |
| 11.5 g | of a 35% strength by weight aqueous solution of the sodium salt of the half-ester of sulfuric acid with ethoxylated p-isooctylphenol (degree of ethoxylation: 25, emulsifier), and |
| 162.9 g | of water. |

Feed 2:

| | |
|---|---|
| 3.3 g | of sodium peroxodisulfate dissolved in |
| 90 g | of water. |

The composition of the monomer mixtures A to F is likewise shown in Table 1.

TABLE 1

| Resulting dispersion | Composition of monomer mixture | Solids content (% by wt.) | LT value | pH | Fox Tg (°C.) |
|---|---|---|---|---|---|
| DA | 219.2 g n-BA; 252.0 g S; 11.2 g AM; 5.6 g MAM; | 55.3 | 8 | 8.7 | 7 |
| DB | 347.2 g n-BA; 196.0 g S; 11.2 g AM; 5.6 g MAM; | 55.6 | 9 | 8.2 | −6 |
| DC | 403.2 g EHA; 140.0 g S; 11.2 g AM; 5.6 g MAA; | 54.9 | 12 | 8.7 | −28 |
| DD | 291.2 g n-BA; 252 g S; 11.2 g AM; 5.6 g MAA; | 56.0 | 5 | 5.1 | 8 |
| DE | 291.2 g n-BA; 252 g S; 11.2 g AM; 5.6 g AA; | 56.0 | 5 | 5.1 | 8 |
| DF | 291.2 g n-BA; 292 g S; 11.2 g MAM; 5.6 g AA; | 55.4 | 17 | 4.8 | 6 | n-BA = n-Butyl acrylate; AM = Acrylamide; EHA = 2-Ethylhexyl acrylate; AA = Acrylic acid; MAM = Methacrylamide; MAA = Methacrylic acid; S = Styrene;

$Tg^{FOX}$ (°C.): The glass transition temperature of the disperse polymer calculated using the Fox relationship. According to Fox (T. G. Fox, Bull. Am. Phys. Soc. (Ser. II) 1 (1956), 123, and Ullmanns Encyklopädie der technischen Chemie, vol. 19, 4th edition, Verlag Chemie, Weinheim (1980), pages 17, 18), a good approximation for the glass transition temperature of copolymers is $1 = X^1 + X^2 + \ldots X^n$, $Tg$ $Tg^1$ $Tg^2$ $Tg^n$ where $X^1, X^2, \ldots, X^n$ are mass fractions $1, 2, \ldots, n$ and $Tg^1, Tg^2, \ldots, Tg^n$ are the glass transition temperatures of the respective polymers composed only of one of the monomers $1, 2, \ldots, n$, in degrees Kelvin. The latter are known, for example, from Ullmann's Encyclopedia of Industrial Chemistry, VCH, Weinheim, Vol. A 21 (1992), page 169.

I. Preparation of anionically stabilized aqueous polymer dispersions DG–TK to be dried DG: A mixture of

| | |
|---|---|
| 600 g | of water, |
| 14 g | of a 20% strength by weight aqueous solution of an ethoxylated tallow fatty alcohol (degree of ethoxylation: 18, emulsifier), |
| 9.8 g | of a 10% strength by weight aqueous formic acid solution, |
| 4.2 g | of sodium bicarbonate, pH buffer, and |
| | 5 % by weight of a feed 1 | was initially taken in a polymerization vessel and heated to 90° C., after which 10% by weight of feed 2 were added. 15 minutes thereafter, while maintaining the temperature at 90° C. and beginning at the same time, but at spacially separate points, the remaining amount of feed 1 was continuously fed into the mixture in the course of 2 hours, and the remaining amount of feed 2 in the course of 2.5 hours. Thereafter, the reaction mixture was kept for a further 2 hours at 90° C. with stirring and was then cooled to 60° C. After the addition of a solution of 2.8 g of tert-butyl hydroperoxide in 16.2 g of water, a solution of 2.8 g of sodium formaldehyde sulfoxylate in 15 g of water was fed continuously into the polymerization vessel in the course of 1 hour while maintaining the temperature of 60° C., after which stirring was continued for a further 0.5 hour at 60° C. 15 minutes later, the mixture was cooled to 25° C. and neutralized by adding 56 g of a 10% strength by weight aqueous sodium hydroxide solution. After filtration through a sieve having a mesh size of 250 μm, an aqueous polymer dispersion DG having a solids content of 49.3% by weight, an LT value of 5 and a pH of its aqueous dispersing medium of 8.6 was obtained. $Tg^{FOX}=5°$ C.

Feed 1: an aqueous emulsion of

| | |
|---|---|
| 770 g | of n-butyl acrylate, |
| 588 g | of styrene, |
| 42 g | of methacrylic acid, |
| 63 g | of a 20% strength by weight aqueous solution of ethoxylated tallow fatty alcohol (degree of ethoxylation: 18, emulsifier), |
| 98 g | of a 30% strength by weight aqueous solution of the sodium salt of the half-ester of sulfuric acid with ethoxylated tallow fatty alcohol (degree of ethoxylation: 30, emulsifier), |
| 33.6 g | of a 5% strength by weight aqueous solution of a hydroxyethylcellulose (Brookfield viscosity at 25° C. and at a solids content of 5% by weight = 150 cps, protective colloid) and |
| 313 g | of water. |

Feed 2:

| | |
|---|---|
| 4.2 g | of sodium peroxodisulfate dissolved in |
| 300 g | of water. |

DH: A mixture of

| | |
|---|---|
| 450 g | of water, |
| 16.0 g | of a 20% strength by weight aqueous solution of an ethoxylated p-isooctylphenol (degree of ethoxylation: 25, emulsifier), |
| 1.4 g | of a 35% strength by weight aqueous solution of the sodium salt of the half-ester of sulfuric acid with ethoxylated p-isooctylphenol (degree of ethoxylation: 25, emulsifier), |
| 11.2 g | of a 10% strength by weight aqueous formic acid solution and |
| 4.8 g | of sodium bicarbonate, pH buffer, | was initially taken in a polymerization vessel and heated to 90° C. Thereafter, while maintaining the temperature at 90° C. and beginning at the same time, but at spacially separate points, a feed 1 was metered continuously into the polymerization vessel in the course of 2 hours, and a feed 2 in the course of 25 hours. Thereafter, the reaction mixture was stirred for 120 minutes at 90° C. and then cooled to 60° C. After the addition of a solution of 3.2 g of tert-butyl hydroperoxide in 16.4 g of water, a solution of 3.2 g of sodium formaldehyde sulfoxylate in 15 g of water was fed continuously into the polymerization vessel in the course of 1 hour while maintaining the temperature of 60° C., and stirring was then continued for a further 0.5 hour at 60° C. 15 minutes later, the mixture was cooled to 25° C. After filtration through a sieve having a mesh size of 250 µm, an aqueous polymer dispersion DH having a solids content of 55.8% by weight, an LT value of 18 and a pH of the aqueous dispersing medium of 3.5 was obtained. $Tg^{FOX}=6°$ C.

Feed 1: an aqueous emulsion of

| | |
|---|---|
| 832 g | of n-butyl acrylate, |
| 720 g | of styrene, |
| 32 g | of hydroxyethyl acrylate, |
| 16 g | of methacrylic acid, |
| 24.0 g | of a 20% strength by weight aqueous solution of an ethoxylated p-isooctylphenol (degree of ethoxylation: 25, emulsifier), |
| 32.9 g | of a 35% strength by weight aqueous solution of the sodium salt of the half-ester of sulfuric acid with ethoxylated p-isooctylphenol (degree of ethoxylation: 25, emulsifier), and |
| 442 g | of water. |

Feed 2:

| | |
|---|---|
| 9.3 g | of sodium peroxodisulfate dissolved in |
| 300 g | of water. |

DI: A mixture of

| | |
|---|---|
| 150 g | of water, |
| 5.6 g | of a 20% strength by weight aqueous solution of ethoxylated tallow fatty alcohol (degree of ethoxylation: 18, emulsifier), |
| 3.9 g | of a 10% strength by weight aqueous formic acid solution, |
| 1.7 g | of sodium bicarbonate, pH buffer, and |
| 3.4 g | of a 20% strength by weight aqueous solution of a polyacrylamide, protective colloid, | was initially taken in a polymerization vessel and heated to 90° C. Thereafter, while maintaining the temperature of 90° C. and beginning at the same time, but at spacially separate points, a feed 1 was fed continuously into the polymerization vessel in the course of 2 hours, and feed 2 in the course of 2.5 hours. Thereafter, the reaction mixture was stirred for a further 120 minutes at 90° C. and then cooled to 60° C. After the addition of a solution of 1.1 g of tert-butyl hydroperoxide in 5.5 g of water, a solution of 1.1 g of sodium formaldehyde sulfoxylate in 5 g of water was added to the polymerization vessel in the course of 1 hour while maintaining the temperature of 60° C., and the reaction mixture was then stirred for a further 0.5 hour at 60° C. 15 minutes later, it was cooled to 25° C. After filtration through a sieve having a mesh size of 250 µm, an aqueous polymer dispersion DI having a solids content of 55.1% by weight, an LT value of 15 and a pH of its aqueous dispersing medium of 7.6 was obtained. $Tg^{FOX}=5°$ C.

Feed 1: an aqueous emulsion of

| | |
|---|---|
| 291.2 g | of n-butyl acrylate, |
| 252.0 g | of styrene, |
| 16.8 g | of methacrylamide, |
| 19.6 g | of a 20% strength by weight aqueous solution of the sodium salt of the half-ester of sulfuric acid with ethoxylated tallow fatty alcohol (degree of ethoxylation: 30, emulsifier), and |
| 156.2 g | of water. |

Feed 2: a solution of

| | |
|---|---|
| 3.2 g | of sodium peroxodisulfate in |
| 100 g | of water. |

DK: As for DI, except that the monomers in Feed 1 consisted of

| 347.2 g | of n-butyl acrylate, |
| 196.0 g | of styrene and |
| 16.8 g | of methacrylamide. |

After filtration through a sieve having a mesh size of 250 μm, an aqueous polymer dispersion DK having a solids content of 55.7% by weight, an LT value of 47 and a pH of its aqueous dispersing medium of 5.9 was obtained. $Tg^{FOX}$= −8° C.

II. Preparation of aqueous solutions of polycationic polyelectrolytes PI to PIX

I: A mixture of 627 g of water and

10% by weight of feed 1 was initially taken in a polymerization vessel and heated to 70° C., and 10% by weight each of feeds 2 and 3 were added. 5 minutes later, while maintaining the temperature at 70° C. and beginning at the same time, but at spacially separate points, the remaining amount of feed 1 was fed continuously into the polymerization vessel in the course of 1 hour, the remaining amount of feed 2 in the course of 1.5 hours and the remaining amount of feed 3 in the course of 1.5 hours. Thereafter, the reaction mixture was stirred for 120 minutes at 70° C., cooled to room temperature and filtered through a 250 μm filter. A clear solution having a solids content of 19.8% by weight and a pH of 9.0 was obtained. K value (1% by weight in water)=93.

Feed 1:

196 g of N-vinylpyrrolidone and 4 g of trimethylammoniumpropylmethacrylamide chloride;

Feed 2:

4 g tert-butyl hydroperoxide dissolved in 101.7 g of water;

Feed 3:

3.2 g of sodium formaldehyde sulfoxylate dissolved in 100 g of water.

PII: As for PI, except that feed 1 consisted of 192 g of N-vinylpyrrolidone and 8 g of trimethylammoniumpropylmethacrylamide chloride. The resulting clear solution had a solids content of 19.7% by weight and a pH of 9.4. K value (1% by weight in water)=92.

PIII: As in Example 13 of EP-B 246 580, 196 g of water, 106 ml of feed 1 and 5 ml of feed 2 were initially taken in a polymerization vessel and heated to 65° C. Thereafter, while maintaining the temperature of 65° C., and beginning at the same time, the remaining amount of feed 1 was fed continuously into the polymerization vessel in the course of 5 hours, and the remaining amount of feed 2 in the course of 7 hours, and, after the end of the feed, stirring was carried out for a further hour at 65° C. A clear solution having a K value (1% by weight in water) of 71 was obtained.

Feed 1:

| 120 g | of 3-methyl-1-vinylimidazolium methylsulfate, |
| 280 g | of vinylpyrrolidone, |
| 250 g | of water and |
| 0.3 g | of 2-mercaptoethanol, the pH of the aqueous solution being brought to 7.5 with concentrated aqueous ammonia; |

Feed 2:

| 2.4 g | of 2,2'-azobis(2-amidinopropane) hydrochloride dissolved in |
| 75 g | of water. |

PIV: As for PIII: except that feed 1 consisted of

| 120 g | of 3-methyl-1-vinylimidazolium chloride, |
| 280 g | of vinylpyrrolidone, |
| 250 g | of water and |
| 1 g | 2-mercaptoethanol, the pH of the aqueous solution being brought to 7.5 with concentrated aqueous ammonia. |

A clear solution was obtained. K value (1% by weight in water)=78, K value (0.5M aqueous NaCl solution)=40.

PV: As for PIII: except that feed consisted of

| 200 g | of 3-methyl-1-vinylimidazolium chloride, |
| 200 g | of vinylpyrrolidone, |
| 250 g | of water and |
| 1 g | of 2-mercaptoethanol, the pH being brought to 7.5 with concentrated aqueous ammonia solution. |

A clear solution was obtained. K value (1% by weight in water)=84.

PVI: 600 g of water were initially taken in a polymerization vessel with attached reflux condenser and were heated to 65° C. in a stream of nitrogen while stirring. After this temperature had been reached, feed 1 was fed continuously into the polymerization vessel in the course of 4 hours, and feed 2 in the course of 5 hours, beginning at the same time and while maintaining the temperature of 65° C. Thereafter, stirring was continued for 2 hours at 65° C. A clear solution was obtained. K value (1% by weight in water)=91, K value (0.5M aqueous NaCl solution)=56.

Feed 1:

| 86 g | of 3-methyl-1-vinylimidazolium methylsulfate, |
| 300 g | of N-vinylpyrrolidone, |
| 400 g | of N-vinylcaprolactam and |
| 500 g | of water. |

Feed 2:

| 3.2 g | of 2,2'-azobis(2-amidinopropane) dihydrochloride dissolved in 100 g of water. |

PVII: As for PVI, except that the total amount of feed 1 was initially taken in the vessel and feed 2 was fed in continuously in the course of 4 hours.

A clear solution was obtained. K value (1% by weight in water)=85, K value (0.5M aqueous NaCl solution)=41.

PVIII: As for PVI, except that the polymerization temperature was 80° C. and feed 2 consisted of 2.3 g of 2,2'-azobis(2-methylbutyronitrile) in 140 g of methanol. The methanol was removed by distillation after the end of the polymerization. K value (1% by weight in water)=77, K value (0.5M aqueous NaCl solution)=34.

PIX: As for PIII, except that feed 1 consisted of

| | |
|---|---|
| 380 g | of 3-methyl-1-vinylimidazolium chloride, |
| 20 g | of vinylpyrrolidone, |
| 250 g | of water and |
| 1 g | of 2-mercaptoethanol, the pH of the aqueous solution being brought to 7.5 with concentrated ammonia. |

IV. Spray-drying of the aqueous polymer dispersions DA to DK after the addition of aqueous polyelectrolyte solutions PI to PIX and comparative experiment The particular aqueous polymer dispersion DA to DK was first diluted to a solids content of 40% by weight, and the particular aqueous polyelectrolyte solution PI to PIX was diluted to a solids content of 25% by weight. An aqueous 25% strength by weight poly-N-vinylpyrrolidone solution was produced, according to Example 1 of EP-A 576 844, as comparative drying assistant VP. A particular aqueous polymer dispersion was then added to the aqueous drying assistant solution all at once and with vigorous stirring in an amount such that a total solids content of 35% by weight resulted.

The spray-drying of the aqueous mixtures was carried out in a Minor laboratory dryer from GEA Wiegand GmbH (Niro Business Unit), Germany, with two-material nozzles (diameter of the nozzle from 0.8 to 2 mm) or disk atomization at a tower inlet temperature of 130° C. and a tower outlet temperature of 60° C. (rate: about 2 kg of spray feed/hour). As an antiblocking agent, 2.5% by weight (based on solid polymer mixture) of a finely divided silica (average maximum particle diameter: 25 μm) were metered into the drying chamber simultaneously with the spray feed.

The following procedure was used for checking the redispersibility of the polymer powders obtained:

90 g of water were weighed into a glass bottle, and 10 g of polymer powder were added at 25° C. The mixture was stirred for 1 minute at 9500 rpm with an Ultra-Turrax 1 from Janke & Kunkel, IKA-Labortechnik, Staufen, Germany, and was introduced into a measuring cylinder. The measuring cylinder closed with a plastic stopper was then stored without movement at 25° C. for 72 hours. Thereafter, the redispersion was thoroughly shaken and was filtered through a 72 μm sieve. The sieve containing the filter cake was stored at 80° C. for 12 hours in a drying oven and the percentage by weight, based on amount of powder used (10 g), of the dried coagulum were then determined by weighing. The results are shown in Table 2. Table 2 also shows the amount of drying assistant, in % by weight and based on disperse polymer, which had been added (calculated as dry matter).

TABLE 2

| Spray-dried mixture | | | |
|---|---|---|---|
| Dispersion | Spray assistant | Atomization | Coagulum |
| DA | PIII | 15% by weight | Nozzle 1.5 | 1.2% by weight |
| DA | PVIII | 15% by weight | Nozzle 1.5 | 0.8% by weight |
| DA | PVII | 15% by weight | Nozzle 1.5 | 1.0% by weight |
| DA | PVI | 15% by weight | Nozzle 1.5 | 2.2% by weight |
| DA | PIV | 5% by weight | Nozzle 0.8 | 0.6% by weight |
| DA | PIV | 10% by weight | Nozzle 0.8 | 0.4% by weight |
| DA | PIV | 15% by weight | Nozzle 1.5 | 0.5% by weight |
| DA | PV | 15% by weight | Nozzle 1.3 | 0.3% by weight |
| DA | PIX | 15% by weight | Nozzle 1.3 | 0.7% by weight |

TABLE 2-continued

| Spray-dried mixture | | | |
|---|---|---|---|
| Dispersion | Spray assistant | Atomization | Coagulum |
| DB | PIV | 15% by weight | Nozzle 1.3 | 0.8% by weight |
| DC | PIV | 15% by weight | Nozzle 1.3 | 0.8% by weight |
| DD | PIV | 15% by weight | Nozzle 0.8 | 0.4% by weight |
| DD | PI | 10% by weight | Disk | 1.0% by weight |
| DD | PII | 10% by weight | Disk | 0.9% by weight |
| DE | PIV | 15% by weight | Nozzle 0.8 | 0.5% by weight |
| DF | PIV | 15% by weight | Nozzle 0.8 | 0.2% by weight |
| DG | PIV | 15% by weight | Nozzle 0.8 | 0.9% by weight |
| DG | PI | 10% by weight | Disk | 1.0% by weight |
| DG | PII | 10% by weight | Disk | 1.1% by weight |
| DH | PIV | 15% by weight | Nozzle 0.8 | 2.0% by weight |
| DI | PIV | 15% by weight | Nozzle 2.0 | 0.2% by weight |
| DK | PIV | 15% by weight | Nozzle 1.5 | 0.5% by weight |
| DA | VP | 15% by weight | Nozzle 1.5 | 4.0% by weight |

*) The number after nozzle indicates its diameter in mm.

We claim:

1. A process for the preparation of polymer powders comprising drying an aqueous polymer dispersion whose polymer particles dispersed in the aqueous medium have a positive or a negative electric surface charge, with the addition of a drying assistant, wherein said drying assistant is a polyelectrolyte which, in its form dissociated into a polyion and opposite ions, is soluble in the aqueous dispersing medium; wherein said aqueous polymer dispersion to be dried is added, by stirring, into the solution of said polyelectrolyte and wherein the electric charge of the polyion is opposite to the electric surface charge of the dispersed polymer particles.

2. A process as claimed in claim 1, wherein the disperse polymer particles have a positive surface charge.

3. A process as claimed in claim 1, wherein the disperse polymer particles have a negative surface charge.

4. A process as claimed in claim 1, wherein the number average molecular weight of the polyelectrolyte is from 1000 to $3 \cdot 10^6$.

5. A process as claimed in claim 1, wherein the polyion of the polyelectrolyte used is an organic polymer.

6. A process as claimed in claim 1, wherein the water solubility at 25° C. and 1 atm of the polyelectrolyte used is $\geq 1$ g per 100 g of water.

7. A process as claimed in claim 1, wherein the polyelectrolyte used is obtainable by free radical polymerization of monomers which have at least one ethylenically unsaturated group and comprise at least one monomer which has groups which can undergo ionic dissociation in an aqueous medium.

8. A process as claimed in claim 7, wherein the polyelectrolyte used contains, as at least one monomer having groups which can undergo dissociation in an aqueous medium, a compound of the formula (I)

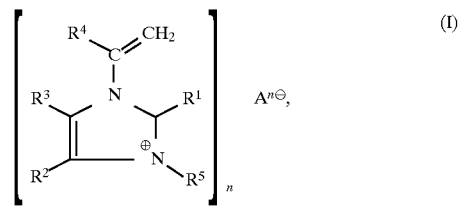

where
$A^{n\ominus}$ is $Cl^{\ominus}$, $Br^{\ominus}$, $I^{\ominus}$, $SO_4^{2\ominus}$, $CO_3^{2\ominus}$, $CH_3{-}OSO_3^{\ominus}$ or $CH_3{-}CH_2{-}OSO_3^{\ominus}$,
$R^1$ to $R^5$, independently of one another, are each $C_1{-}C_{20}$alkyl, benzyl or H and
n is 1 or 2,
in the form of polymerized units.

9. A process as claimed in claim 7, wherein the polyelectrolyte used contains, as at least one monomer having groups which can undergo dissociation in an aqueous medium, a compound of the formula (II)

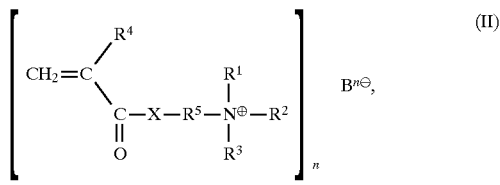

where
X is NH or O,
$R^4$ is H or $C_1$–$C_{20}$-alkyl,
$R^5$ is $C_1$–$C_{20}$-alkylene,
$R^1$, $R^2$ and $R^3$, independently of one another, are each $C_1$–$C_{20}$-alkyl,
$B^{n\ominus}$ is $Cl^\ominus$, $Br^\ominus$, $I^\ominus$, $SO_4^{2\ominus}$, $CO_3^{2\ominus}$, $CH_3$—$OSO_3^\ominus$ or $CH_3$—$CH_2$—$OSO_3^\ominus$ and
n is 1 or 2,
in the form of polymerized units.

10. A process as claimed in claim 7, wherein the polyelectrolyte used contains, as at least one monomer having groups which can undergo dissociation in an aqueous medium, a compound of the formula (III)

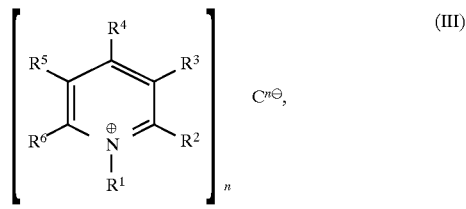

where
$R^1$ $R^6$, independently of one another, are each H or $C_1$–$C_{20}$-alkyl, but one of the radicals $R^1$ to $R^6$ is —CH=CH$_2$,
$C^{n\ominus}$ is $Cl^\ominus$, $Br^\ominus$, $I^\ominus$, $SO_4^{2\ominus}$, $CO_3^{2\ominus}$, $CH_3$—$OSO_3^\ominus$ or $CH_3$—$CH_2$—$OSO_3^\ominus$, and
n is 1 or 2,
in the form of polymerized units.

11. A process as claimed in claim 7, wherein the polyelectrolyte used contains, as at least one monomer having groups which can undergo dissociation in an aqueous medium, a compound of the formula (IV)

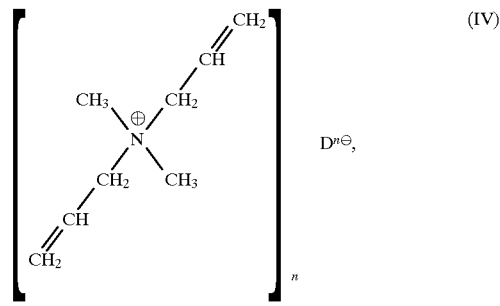

where
$D^{n\ominus}$ is $Cl^\ominus$, $Br^\ominus$, $I^\ominus$, $SO_4^{2\ominus}$, $CO_3^{2\ominus}$, $CH_3$—$OSO_3^\ominus$ or $CH_3$—$CH_2$—$OSO_3^\ominus$ and
n is 1 or 2,
in the form of polymerized units.

12. A process as claimed in claim 7, wherein the polyelectrolyte used contains, as at least one monomer having groups which can undergo dissociation in an aqueous medium, a salt of an α,β-monoethylenically unsaturated carboxylic acid of 3 to 6 carbon atoms in the form of polymerized units.

13. A process as claimed in claim 7, wherein the polyelectrolyte used contains, as at least one monomer having groups which can undergo dissociation in an aqueous medium, vinylsulfonic acid or one of its salts in the form of polymerized units.

14. A process as claimed in claim 7, wherein the polyelectrolyte used contains, as at least one monomer having groups which can undergo dissociation in an aqueous medium, a compound of the formula (V)

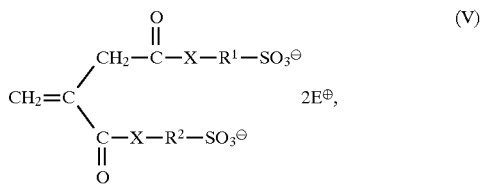

where
$R^1$ and $R^2$ are each $C_1$–$C_{10}$-alkylene,
X is O or NH, and
$E^\oplus$ is an alkali metal ion, $NH_4^\oplus$ or (alkaline earth metal ion)$_{1/2}$,
in the form of polymerized units.

15. A process as claimed in claim 7, wherein the polyelectrolyte used contains, as at least one monomer having groups which can undergo dissociation in an aqueous medium, a compound of the formula (VI)

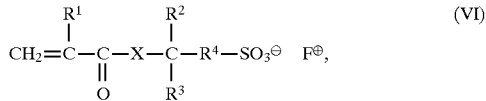

where
$R^1$, $R^2$ and $R^3$ are each $C_1$–$C_3$-alkyl,
$R^4$ is $C_1$–$C_5$-alkylene,
X is O or NH and
$F^\oplus$ is an alkali metal ion, $NH_4^\oplus$ or (alkaline earth metal ion)$_{1/2}$,
in the form of polymerized units.

16. A process as claimed in claim 7, wherein the polyelectrolyte used contains, as at least one monomer having groups wich can undergo dissociation in an aqueous medium, a compound of the formula (VII) or (VIII)

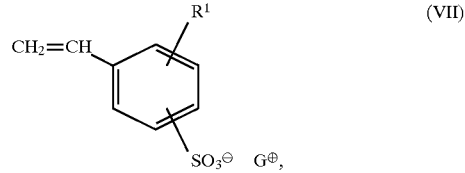

where
$R^1$ is $C_1$–$C_5$-alkyl and
$G^\oplus$ is an alkali metal ion, $NH_4^\oplus$ or (alkaline earth metal ion)$_{1/2}$,
in the form of polymerized units.

17. A process as claimed in claim 7, wherein the polyelectrolyte contains from 5 to 100% of its weight of at least one ethylenically unsaturated monomer having groups which can undergo ionic dissociation in an aqueous medium, in the form of polymerized units.

18. A process as claimed in claim 7, wherein the polyelectrolyte contains from 20 to 100% of its weight of at least one ethylenically unsaturated monomer having groups which can undergo ionic dissociation in an aqueous medium, in the form of polymerized units.

19. A process as claimed in claim 7, wherein the polyelectrolyte contains from 40 to 100% of its weight of at least one ethylenically unsaturated monomer having groups which can undergo ionic dissociation in an aqueous medium, in the form of polymerized units.

20. A process as claimed in claim 1, wherein the polymer dispersed in the aqueous polymer dispersion is composed of from 70 to 100% by weight of esters of acrylic or methacrylic acid with alkanols of 1 to 12 carbon atoms or styrene in the form of a polymer obtained by free radical polymerization.

21. A process as claimed in claim 1, wherein the polymer dispersed in the aqueous polymer dispersion is composed of from 70 to 100% by weight of styrene or butadiene in the form of a polymer obtained by free radical polymerization.

22. A process as claimed in claim 1, wherein the polymer dispersed in the aqueous polymer dispersion is composed of from 40 to 100% by weight of vinyl chloride or vinylidene chloride in the form of a polymer obtained by free radical polymerization.

23. A process as claimed in claim 1, wherein the polymer dispersed in the aqueous polymer dispersion is composed of from 40 to 100% by weight of vinyl acetate, vinyl propionate or ethylene in the form of a polymer obtained by free radical polymerization.

24. A process as claimed in claim 1, wherein the glass transition temperature of the polymer dispersed in the aqueous polymer dispersion is $\leq 50°$ C.

25. A process as claimed in claim 1, wherein the glass transition temperature of the polymer dispersed in the aqueous polymer dispersion is $\leq 25°$ C.

26. A process as claimed in claim 1, wherein the drying is carried out by the spray-drying method.

27. A process as claimed in claim 26, wherein the inlet temperature of the warm air stream is from 100° to 200° C. and the outlet temperature of the warm air stream is from 30° to 90° C.

* * * * *